(12) United States Patent
Handshaw et al.

(10) Patent No.: US 11,132,520 B2
(45) Date of Patent: Sep. 28, 2021

(54) INDUSTRIAL DIGITAL BARCODE READER

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/713,227

(22) Filed: Dec. 13, 2019

(65) Prior Publication Data

US 2021/0182517 A1  Jun. 17, 2021

(51) Int. Cl.
*G06K 7/10* (2006.01)

(52) U.S. Cl.
CPC ..... *G06K 7/10831* (2013.01); *G06K 7/10782* (2013.01)

(58) Field of Classification Search
None
See application file for complete search history.

(56) References Cited

U.S. PATENT DOCUMENTS

| | | | |
|---|---|---|---|
| 5,572,007 A | 11/1996 | Aragon et al. | |
| 8,919,651 B2 * | 12/2014 | Gao | G06K 7/10722 235/454 |
| 2010/0133344 A1 | 6/2010 | Yamanouchi et al. | |
| 2013/0075474 A1 | 3/2013 | Vinogradov | |
| 2013/0306735 A1 * | 11/2013 | Vinogradov | G06K 7/10732 235/470 |
| 2015/0048165 A1 | 2/2015 | Drzymala et al. | |

FOREIGN PATENT DOCUMENTS

| | | |
|---|---|---|
| CN | 204166540 U | 2/2015 |
| CN | 111524305 A | 8/2020 |

OTHER PUBLICATIONS

Combined Search and Examination Report for UK Patent Application No. GB2019555.8 dated May 14, 2021.

* cited by examiner

*Primary Examiner* — Kristy A Haupt
(74) *Attorney, Agent, or Firm* — Yuri Astvatsaturov

(57) ABSTRACT

A convertible slot scanner assembly for capturing at least one object appearing in a field of view (FOV) is provided that includes a chassis body, a circuit board, an imaging sensor, a controller, an image decoder, and a first window. The chassis body includes an upper side, a front side forming an opening, a rear side, and an optical cavity. The circuit board is positioned at or near the upper side of the chassis. The imaging sensor, controller, and image decoder are all operably coupled with the circuit board, with the imaging sensor being directed toward the optical cavity to capture an image frame, the controller being in communication with the imaging sensor, and the image decoder configured to receive the image frame. The first window is configured to at least partially cover the opening of the chassis.

44 Claims, 5 Drawing Sheets

INDUSTRIAL DIGITAL BARCODE READER

BACKGROUND OF THE INVENTION

Barcode and other scanning devices generally capture images within a given field of view (FOV). Barcode readers may be provided to be used in a various orientations depending on environments. For example, some barcode readers may be implemented in a generally vertical orientation to be used in countertops, kiosks, and other vertical scanning environments, and may also be used in a generally horizontal orientation to be used in table or platter environments. Typically, horizontal and vertical barcode readers have different design requirements due to differing fields of view. More specifically, in vertical orientations, the FOV is typically parallel to the tabletop (i.e., perpendicular to the front face of the barcode reader). Conversely, in the horizontal orientation, the FOV is tilted in order to scan barcodes on packages in differing orientations.

These differing design requirements oftentimes require different housing and component locations as well as additional components such as printed circuit boards. Some such configurations may be prone to damage from liquids or other foreign matter that may inadvertently enter the device.

Accordingly, there is a need for improved accessories having improved functionalities.

SUMMARY

According to a first aspect, a convertible slot scanner assembly for capturing at least one object appearing in a field of view (FOV) is provided that includes a chassis body, a circuit board, an imaging sensor, a controller, an image decoder, and a first window. The chassis body includes an upper side, a front side forming an opening, a rear side, and an optical cavity. The circuit board is positioned at or near the upper side of the chassis. The imaging sensor, controller, and image decoder are all operably coupled with the circuit board, with the imaging sensor being directed toward the optical cavity to capture an image frame, the controller being in communication with the imaging sensor, and the image decoder configured to receive the image frame. The first window is configured to at least partially cover the opening of the chassis.

In some examples, the convertible slot scanner assembly further includes at least one fold mirror at least partially disposed in the optical cavity. The at least one fold mirror is configured to redirect the FOV of the imaging sensor through the first window. In some forms, the assembly further includes at least one interconnect positioned at the upper side of the chassis body that is operably coupled with the circuit board. The interconnect may be downwardly-facing.

In some examples, the assembly may further include an illumination assembly positioned at or near the upper side of the chassis. The illumination assembly may be operably coupled with the circuit board. Further in some examples, each of the imaging sensor, the illumination assembly, the image decoder, and the controller may be disposed on the circuit board. In some approaches, the assembly may include a second circuit board to which the illumination assembly may be operably coupled. In some forms, the chassis may further include an illumination cavity positioned a distance from the optical cavity and being at least partially isolated therefrom.

In some forms, the assembly may further include a housing having a housing cavity dimensioned to at least partially accommodate the chassis. The housing is positionable in a first, horizontal configuration whereby the first window is in a generally horizontal orientation and a second, vertical configuration whereby the first window is in a generally upright orientation. The assembly may further include at least one cable guide member formed in the housing to accommodate an interface cable.

In some examples, the convertible slot scanner may further include a first adapter configured to be coupled with the chassis when the housing is positioned in the horizontal configuration, a second adapter configured to be coupled with the chassis when the housing is positioned in the vertical configuration, and a flange portion at least partially surrounding the opening of the chassis body. The first adapter may be in the form of a platter including a platter opening and a second window configured to at least partially cover the platter opening. In some of these examples, the first adapter may additionally include a tub. The tub is configured to engage at least one of the housing or the flange portion of the chassis. The platter is configured to engage at least one of the tub, the flange portion of the chassis, or the housing.

In some examples, the second adapter may include an outer bezel configured to engage at least one of the housing or the flange portion of the chassis. The outer bezel may protrude outwardly from the first window to form a recessed region.

In some forms, the convertible slot scanner assembly includes at least one interface element. The at least one interface element may include at least one of at least one button, an illumination member, or a sound generating device. In examples where the at least one interface element is in the form of a sound generating device, the flange portion of the chassis may further include at least one sound port. In examples where the interface element is in the form of at least one button, the button is engagable through the flange portion of the chassis. In examples where the interface element is in the form of the illumination member, the illumination member is viewable through the first window.

In some examples, the first window sealingly engages the optical cavity. In some examples, the chassis may include a flange portion having at least one mounting mechanism. Further, in some examples, the chassis may include a mirror support member.

In some examples, the FOV may be arranged non-perpendicularly relative to the first window. In some forms, the circuit board may be the only circuit board provided in the assembly.

In accordance with a second embodiment, a convertible slot scanner assembly for capturing at least one object appearing in a field of view (FOV) is provided that includes a chassis body, a circuit board, at least one fold mirror, an imaging sensor, a controller, an image decoder, and a first window. The chassis body includes an upper quadrant, a front quadrant, a front face formed on the front quadrant, an optical cavity, and an opening formed on the front face. The circuit board is positioned within the upper quadrant of the chassis. The at least one fold mirror is positioned within the optical cavity. The imaging sensor, controller, and image decoder are all operably coupled with the circuit board, with the imaging sensor being directed toward the optical cavity to capture an image frame, the controller being in communication with the imaging sensor, and the image decoder configured to receive the image frame. The first window is configured to at least partially cover the opening of the chassis and is positioned within the front quadrant of the chassis and angled less than approximately 15° relative to a plane formed by the front face of the chassis body. The at least one fold mirror is configured to direct the FOV through the window. A central axis of the FOV is angled less than approximately 20° relative to a plane perpendicular to the front face.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
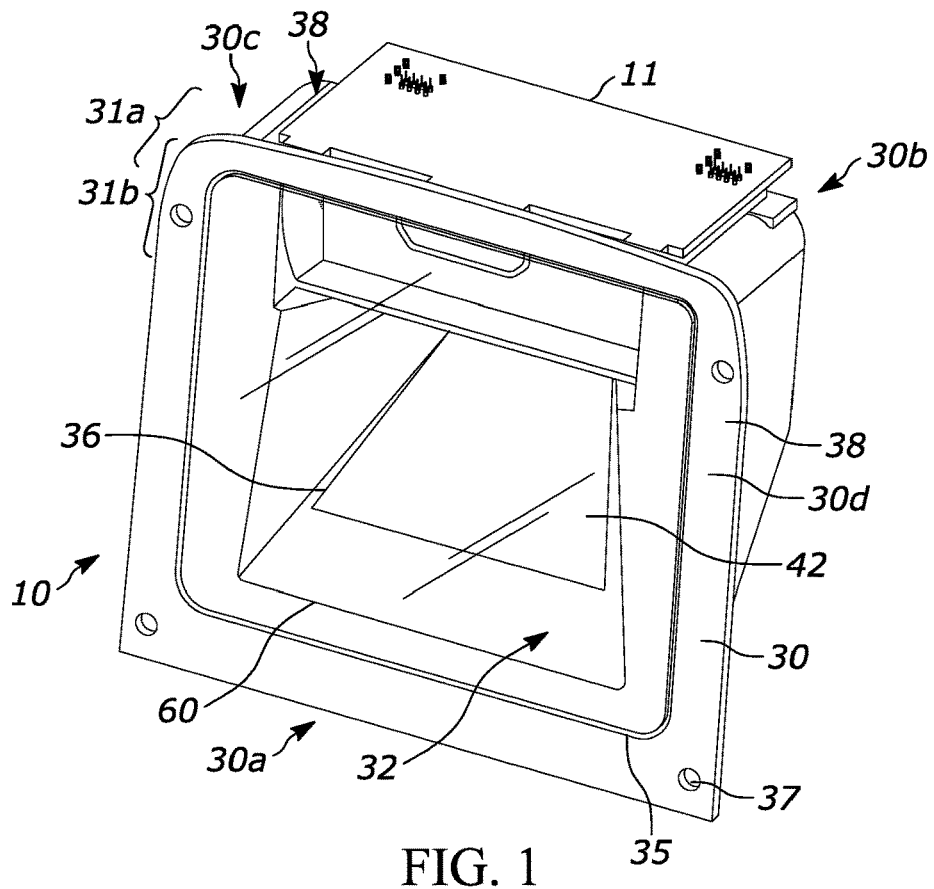
FIG. 1 is a front perspective view of an industrial digital barcode reader assembly in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, reference numeral 10 generally identifies a convertible slot scanner assembly for capturing at least one image of an object appearing in a field of view (FOV). The convertible slot scanner assembly 10 includes a circuit board 11, an imaging sensor 12, a controller 16, an image decoder 20, at least one interconnect 22, a chassis body 30, a first window 60, and in some examples, a housing 70.

The chassis 30 includes a front side 30a, a rear side 30b, an upper side 30c, a front face 30d at the front side 30a, an optical cavity 32, and an opening 34 formed on the front side 30a. In some examples, the chassis 30 may be segmented into quadrants, and may include a front quadrant 31a, an upper quadrant 31b, and so on. It is appreciated that while the remaining quadrants are not provided with reference numerals, each quadrant may be approximately one fourth of the relative dimension (e.g., a thickness or height dimension) of the chassis 30. Further, the optical cavity 32 may include and/or define a mirror support surface 36.

Generally speaking, the chassis 30 is configured to accommodate all of the opto-mechanics such as the imaging sensor 12, the controller 16, the image decoder 20, and the interconnect or interconnects 22. Put differently, in the illustrated examples, the imaging sensor 12, the controller 16, the image decoder 20, and the interconnect or interconnects 22 are all advantageously disposed on the circuit board 11, which is positioned at or near the upper side 30c and/or the upper quadrant 31b of the chassis. Notably, by positioning these components in the upper region of the chassis, they are less susceptible to damage via liquids or other undesirable objects such as dirt, dust, grime, and the like when the convertible slot scanner assembly 10 is positioned in any of its possible orientations or configurations. Further, by using the chassis 30 to mount the opto-mechanics separately from the housing 70, the assembly 10 may be used in kiosk applications where the assembly 10 does not need the additional housing, thereby reducing costs.

In some examples, the chassis 30 may further include a flange 38 that at least partially surrounds the opening 34. In examples where the system includes the housing 70, the flange 38 may act as a mounting mechanism and/or a seal to seal the entire perimeter of the housing 70. The system 10 may further include a seal member such as a gasket (not illustrated) to seal the housing 70 and to create a dust seal and/or an electrostatic discharge seal. The chassis 30 may be constructed from any number of suitable materials such as, for example, metals and/or polymers.

In the illustrated example, the opening 34 further defines a supporting ledge or recess 35. Further, the flange 38 may include any number of mounting features 37 (e.g., holes) to accommodate mounting of the chassis 30 in horizontal, vertical, and/or kiosk applications. However, in other examples (not illustrated), the flange may not be carried by the chassis 30, but rather may be carried by components used to mount the chassis 30 in horizontal, vertical, and/or kiosk applications.

The optical cavity 32 is a generally hollow region that allows light to pass through to the imaging sensor 12. A fold mirror 42 is disposed on the mirror support surface 36 within the optical cavity 32 to redirect the FOV of the imaging sensor 12. The illustrated examples include a single fold mirror 42, which, when combined with the relatively high placement of the imaging sensor 12, advantageously increases a length of the optical path, thereby resulting in a large FOV at the first window 60. Further, such a configuration allows for the FOV to gradually grow, which provides for the retention of resolution as compared to previous designs having rapidly-growing FOVs that in turn lose resolution rapidly outside of the optical cavity 32. In some examples, the fold mirror 42 may include length tolerances to account for any pointing errors of the optical sensor 12. Further, it is appreciated that any number of fold mirrors 42 may be used. In some examples, the fold mirror 42 is positioned to cause a central axis of the FOV to be angled less than approximately 20° relative to a plane perpendicular to the front face 30*d* of the chassis 30. Other examples are possible.

The chassis 30 includes a mounting portion 38 (e.g., a generally flat surface) that accommodates the circuit board 11 by securing the circuit board 11 thereto via any number of suitable approaches. In some examples, only a single circuit board 11 is provided in the convertible slot scanner assembly 10, which may advantageously reduce component costs, reduce the overall number of interconnects, and increase overall reliability. The imaging sensor 12, the controller 16, the image decoder 20, and/or the interconnect 22 may all be directly and/or operably coupled with the circuit board 11 via any number of suitable approaches.

The imaging sensor 12 is configured to capture an image frame appearing in a FOV The imaging sensor 12 can include any number of photosensitive elements. In some examples, the imaging sensor 12 may have a resolution of 2 megapixels, though other examples are possible. The image decoder 20 is communicatively coupled with the imaging sensor 12 and is configured to decode a barcode captured in an image by the imaging sensor 12. In some examples, only the imaging sensor 12 is communicatively coupled to the decoder 20 and is used to process images for decoding indicia.

Figure 2:
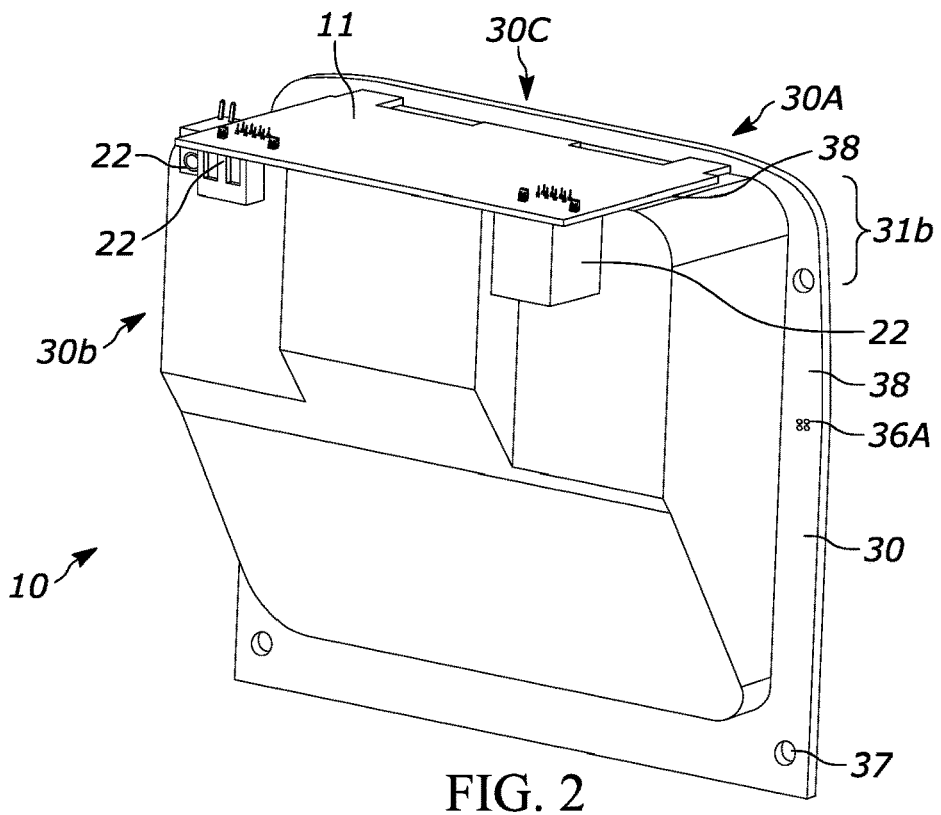
FIG. 2 is a rear perspective view of the industrial digital barcode reader assembly of FIG. 1 in accordance with this disclosure.
Figure 5:
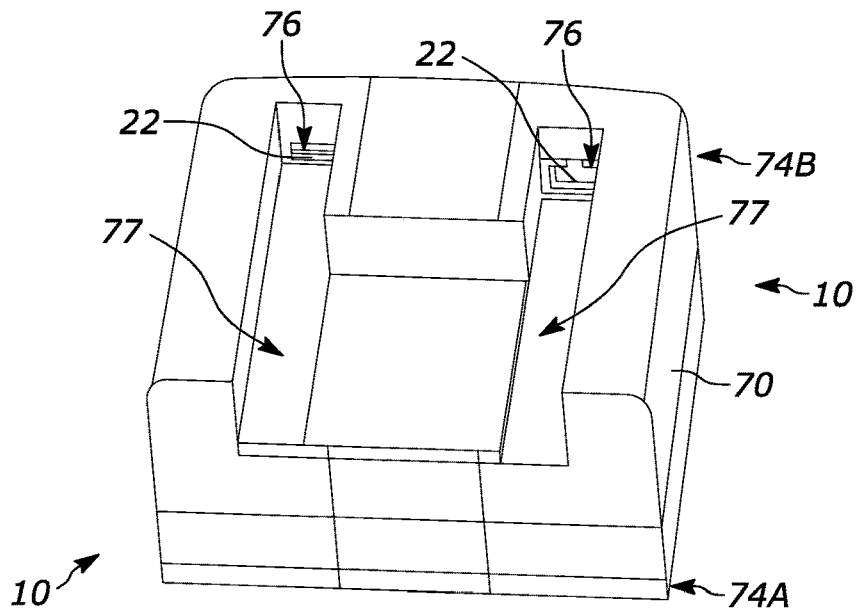
FIG. 5 is a rear perspective view of the industrial digital barcode reader assembly of FIGS. 1-4 in accordance with this disclosure.
Figure 6:
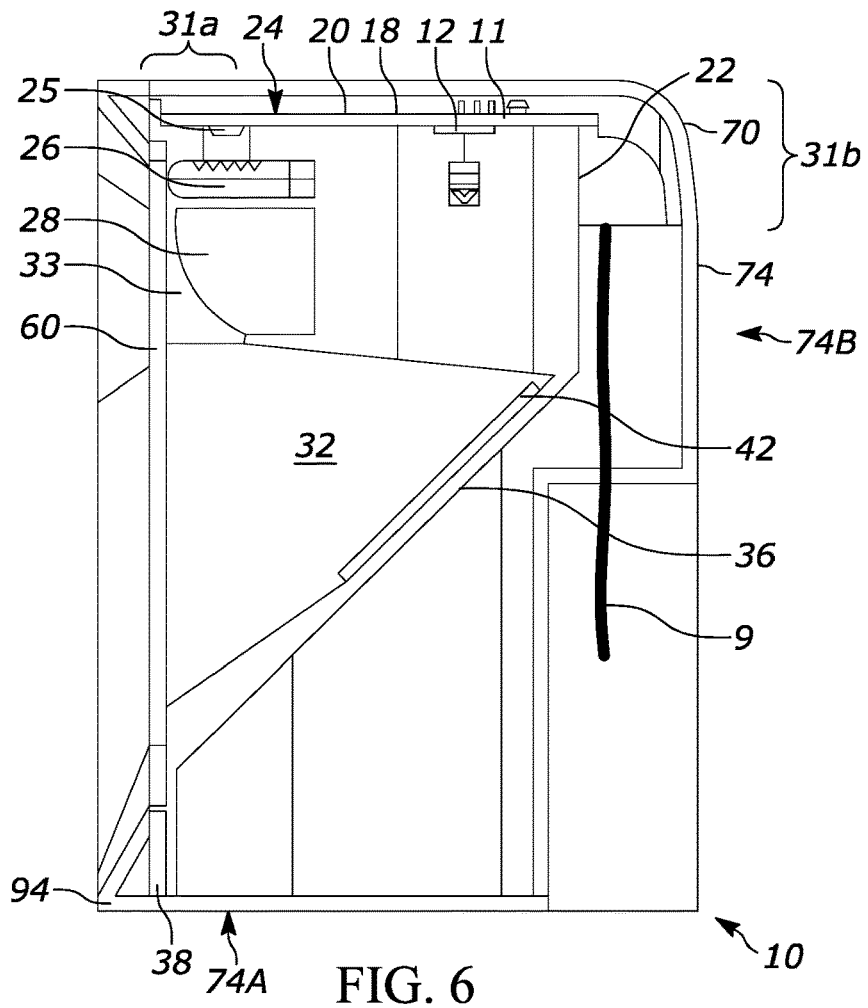
FIG. 6 is a side elevation cross sectional view of the industrial digital barcode reader assembly of FIGS. 1-5 in accordance with this disclosure.

As previously mentioned, in some examples, the interconnect 22 is disposed on the chassis 30. In the illustrated examples, the interconnect is located at the rear side 30*b* of the chassis 30. As illustrated in FIGS. 5-8, the interconnect 22 is downwardly-facing, meaning any cables 9 connected therewith may be routed downwardly. Accordingly, the cable 9 may be disposed within the volume or footprint of the chassis 30. Further, this orientation assists in preventing spills and/or drips of fluid from entering the interconnect 22 in both vertical and horizontal configurations of the chassis 30. As illustrated in FIGS. 2 and 5, any number of different interconnects 22 may be used such as, for example, a main product cable (e.g., an RJ45/RS32 cable), a cable used for a point of sale interface if the assembly 10 is used to host another scanner (e.g., a mini slot handheld scanner), and/or a PCB barrel jack power cable that may be used if an auxiliary scanner is provided. Other examples are possible.

The scanner assembly 10 may additionally include an illumination assembly 24 that may be directly and/or operably coupled with the circuit board 11 via any number of suitable approaches. Accordingly, the illumination assembly 24 is also positioned at or near the upper side 30*c* of the chassis 30. In some examples (not illustrated), the illumination assembly 24 may be operably coupled with a second, separate circuit board, which may also be positioned at or near an upper region of the chassis 30. The illumination assembly 24 may be positioned in a separate illumination cavity 33 of the chassis 30 that is separated (i.e., positioned a distance) and at least partially isolated from the optical cavity 32.

In these examples, the illumination assembly 24 may be in the form of an off-axis illumination assembly. The illumination assembly 24 may include any number of light emitting diodes (LEDs) 25, a lightpipe 26, and can further include an illumination lens 28 that evenly distributes the emitted light. In some examples, the LEDs 25 may be in the form of Oslon illumination LEDs that have an approximately 70% intensity over the desired illumination angle (e.g., approximately 60°). Other examples are possible. As with the FOV, light provided by the illumination assembly 24 exits the first window 60 and acts to illuminate the FOV during scanning. In some examples, the illumination assembly 24 may be tilted downwardly relative to the front face 30*d* of the chassis 30 to reduce and/or eliminate glare in the vertical orientation.

The window 60 is generally supported by the chassis 30 and is configured to allow light to pass between a product-scanning region and the cavity 32 of the chassis 30. The first window 60 is generally positioned on the front side 30*a* and within front quadrant 31*a* of the chassis 30. More specifically, in the illustrated example, the window 60 is configured to be positioned on the ledge or recess 35 of the chassis 30. In other examples, the window 60 may simply be configured to at least partially cover the opening 34 of the chassis 30 via any number of suitable approaches. In some examples, the first window 60 is configured to be angled less than approximately 15° relative to a plane formed by the front face 30*d* of the chassis 30. In some examples such as FIG. 6, the window 60 is configured to be proud of the flange 38 such that the window 60 may be disposed flush with a front bezel of a kiosk (not illustrated) when mounted thereto. In other examples, the window 60 is configured to be generally flush with the flange 38 when disposed within (or covering) the opening 34 of the chassis 30. Accordingly, the assembly 10 may be used in kiosk applications that do not include a recessed window what may accumulate debris.

With reference to FIG. 3-9, the housing 70 may include a housing cavity dimensioned to at least partially accommodate the chassis 30. The housing 70 may be approximately 5.4" tall by approximately 6.0" wide. The housing 70 further includes an exterior surface 74 that, in some examples, may have a generally tapered profile when viewed from the first end 74*a* to the second end 74*b* thereof. As illustrated in FIG. 5, the second end 74*b* of the housing 70 may include openings 76 that are dimensioned and positioned to accommodate the interconnects 22 disposed on the circuit board 11. Further, the second end 74*b* of the housing 70 may include any number of cable guide members or guiding grooves 77 that are sized and dimensioned to receive cables 9 that are inserted and/or coupled with the interconnects 22. In some examples (not illustrated) the guiding grooves 77 may further include clips or securement features to secure the cable 9.

The housing 70 is positionable in a first, horizontal configuration (FIGS. 3 and 9) where the first window 60 is in a generally horizontal orientation and a second, vertical configuration (FIGS. 4 and 6-8) where the first window 60 is in a generally vertical orientation. More specifically, the housing 70 may be operably coupled with first and second adapters 80, 94, respectively, for selectively positioning the slot scanner assembly 10 in horizontal and vertical configurations. In horizontal configurations, the slot scanner assembly 10 may be disposed within a countertop 8 (FIG. 3) where the scanner assembly 10 may be a part of a conveyor or similar checkout environment. In vertical configurations, the slot scanner assembly 10 may be used in kiosks and/or countertop environments.

Figure 3:
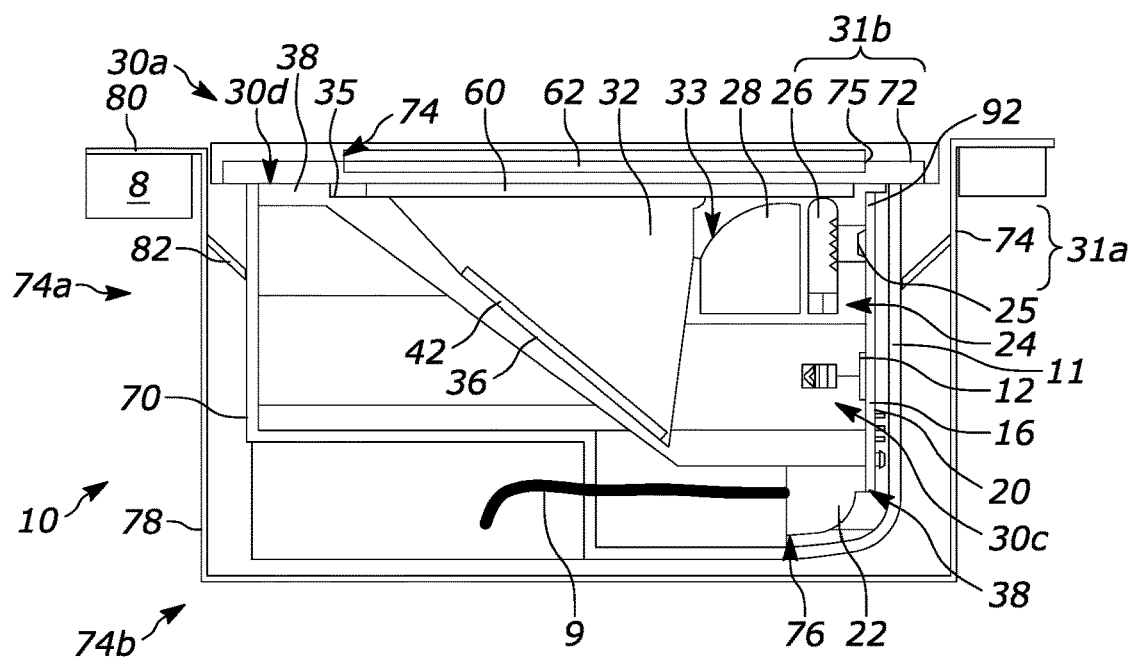
FIG. 3 is a side elevation cross sectional view of the industrial digital barcode reader assembly of FIGS. 1 and 2 coupled with a first adapter in accordance with this disclosure.
Figure 4:
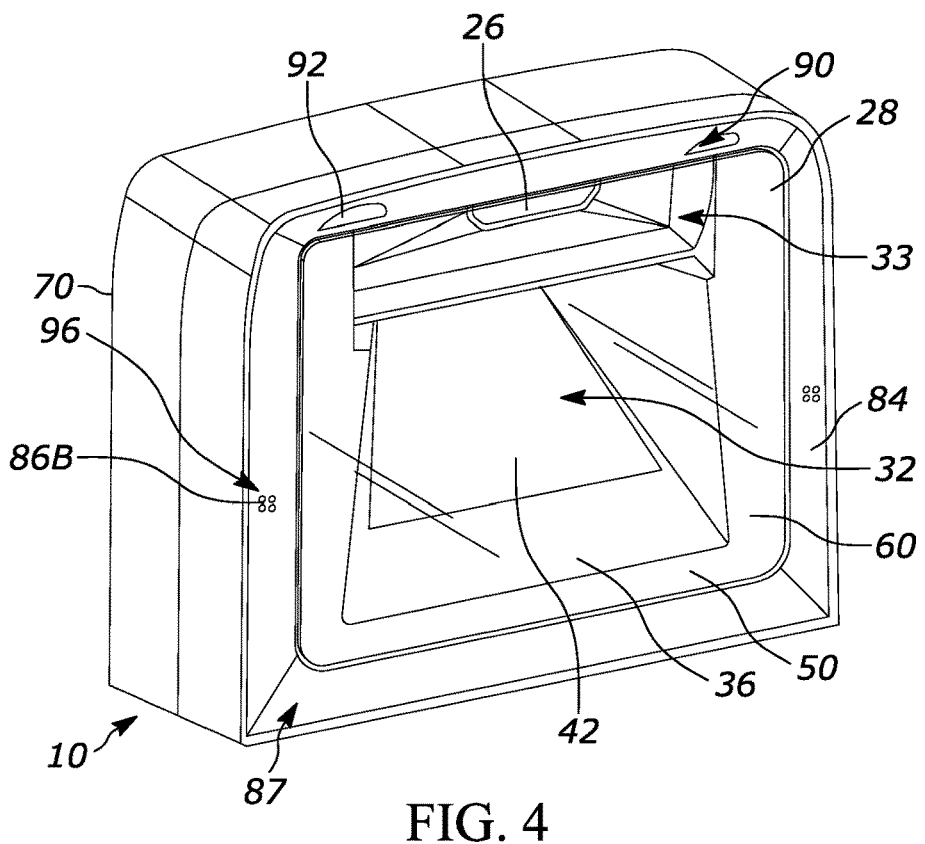
FIG. 4 is a front perspective view of the industrial digital barcode reader assembly of FIGS. 1-3 coupled with a second adapter in accordance with this disclosure.
Figure 9:
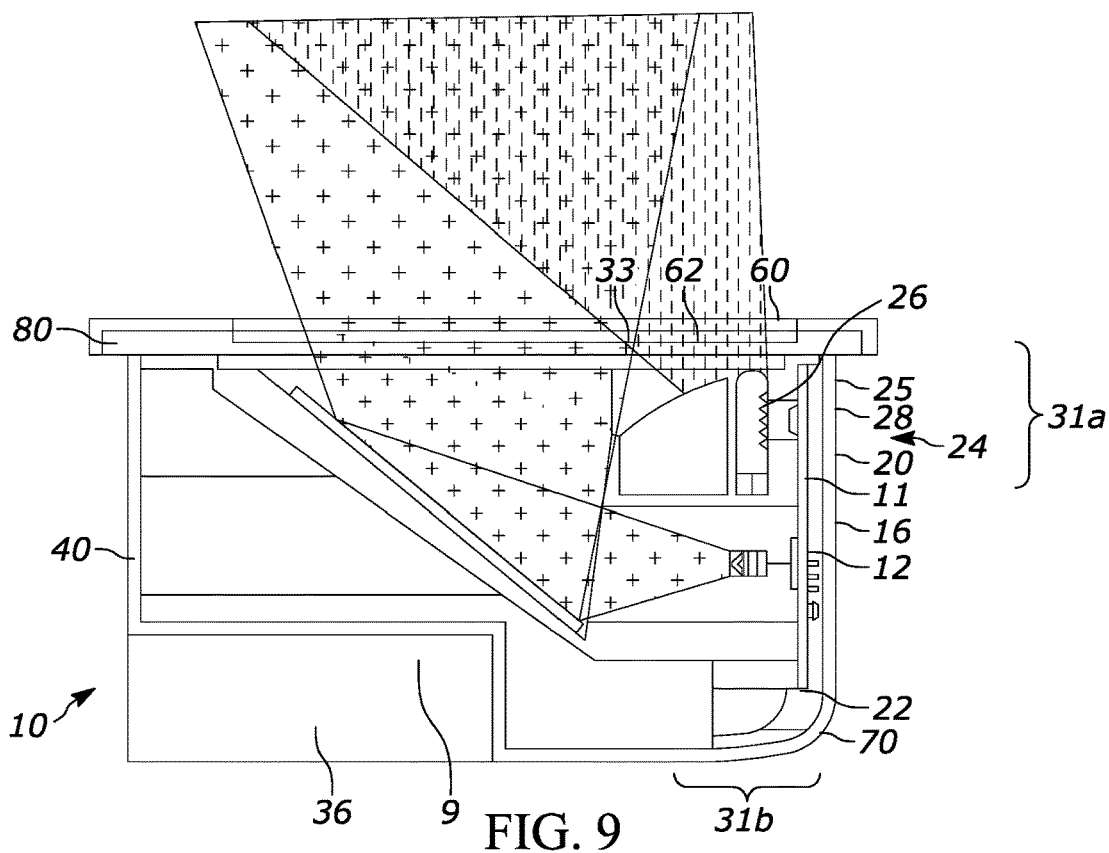
FIG. 9 is a side elevation cross sectional view of the industrial digital barcode reader assembly of FIG. 8 in a horizontal orientation illustrating the alternative FOV in accordance with this disclosure.

Turning to FIGS. 3 and 9, the first adapter 70 is used to position the slot scanner assembly 10 in the horizontal configuration, and includes a platter 72 including a platter opening 74 and a second window 62. In some examples, the first adapter 70 may additionally include a tub 78. As with the chassis 30, the platter opening 74 further defines a supporting ledge or recess 75. The platter 72 may be supported by the housing 70, the flange 38 of the chassis 30, and/or the tub 78. In some examples, the platter 72 may simply rest on top of the housing 70, and in other examples, the platter 72 may be operably coupled therewith. In any of these examples, the platter 72 may be removable from the assembly 10 for cleaning and/or inspection purposes while the housing 70 may be retained in the horizontal position. In some examples, the platter 72 may be keyed so that it senses coupling with the assembly 10.

The second window 62 is generally supported by the platter 72 and is configured to allow light to pass from the product-scanning region, the second window 62, the first window 60, and into the cavity 32 of the chassis 30. The second window 62 may be constructed from a harder material than the first window 60 such as, for example, sapphire and/or a glass having a diamond like carbon coating capable of resisting scratching or scuffing damage when items (e.g., products) are slid thereacross during the item scanning process. In some examples, the second window 62 may have a smaller area than the first window 60. More specifically, the first window 60 may have a larger area to support a larger field of view for the vertical and kiosk embodiments, whereas the second window 62 may have a smaller area that clips or reduces the size of the FOV because the harder materials such as sapphire may be more costly, and such a reduced area may lower costs. In some examples, the imaging FOV can be used to detect the presence of the platter 72, and, when coupled with a sensor such as an accelerometer, may prevent the operation of the scanner when the platter 72 is not seen in the FOV. In some examples, a barcode or other symbol (not illustrated) may be placed on an underside of the platter 72 that may be within the FOV of the first window 60. Such a symbol may be used to assist the device 10 in recognizing the presence of the platter 72.

In the illustrated example, the second window 62 is configured to be positioned on the ledge or recess 75 of the platter 72. In other examples, the second window 62 may be configured to at least partially cover the opening 74 of the platter 72 via any number of suitable approaches. In the illustrated examples, the second window 62 is configured to be generally flush with the platter 72 when disposed within (or covering) the opening 74 of the platter 72. Accordingly, items desired to be scanned may slide across these surfaces without being bumped or otherwise jostled. The platter 72 may further include a directional indicator (not illustrated) to provide a user with a visual indication of the scan direction.

In some examples, the tub 78 has a tub cavity dimensioned to at least partially accommodate the housing 70. In the illustrated example, the tub 78 includes a flange 80 that rests on the counter 8. Accordingly, the counter 8 is configured to support the weight of the tub 78 as well as any components disposed therein. The tub 78 may further include any number of centering arms 82 that extend into the tub cavity. The tub 78 may be dimensioned to fit in standard 6"×6" counter openings for horizontal mini slot scanners. The centering arms 82 may be used to center the housing 70 within the tub cavity due to the smaller size of the housing (e.g., approximately 5.4"×6"). Accordingly, the centering arms 82 may be used to retain smaller scan assemblies. In some examples, the centering arms 82 may be constructed from a resilient and/or a flexible material to allow differing housings to be disposed within the tub cavity. Other examples are possible. In other examples, the tub 78 may be configured to engage and couple with the flange 38 of the chassis 30.

Advantageously, by positioning the interconnects 22 at the upper side 30c of the chassis 30, the cable 9 may simply angle downward into the volume or footprint below the scanner assembly 10. As a result, the cable 9 may remain plugged in during installation and removal of the scanner assembly 10, and the scanner assembly 10 needn't be angled or otherwise repositioned during installation.

Turning to FIGS. 4 and 6-8, the second adapter 84 is used to position the slot scanner assembly 10 in the vertical configuration, and includes an outer bezel 86 or ring member. The outer bezel 86 is configured to engage at least one of the housing 70 or the flange 38 of the chassis 30. In some examples, the outer bezel 86 may include prongs (not illustrated) that are insertable into the mounting features 37 formed on the flange 38 of the chassis 30. As a result, in the illustrated example, the outer bezel 86 may be snapped onto the chassis 30 and may retain the first window 60, and can protrude outwardly from the first window 60 to form a recessed region 87.

Advantageously, by positioning the interconnects 22 at the upper side 30c of the chassis 30, the cable 9 may simply drop downwardly into the volume or footprint below the scanner assembly 10, thereby reducing the overall footprint of the scanner assembly 10.

As previously noted, the scanner assembly 10 may also be used in kiosk environments. By removing the outer bezel 86 and/or the housing 70, the mounting features 37 may be used to secure to a kiosk housing (not illustrated). In these examples, the first window 60 may be generally parallel with the kiosk housing to provide a wide FOV. By removing these components, the assembly 10 is less expensive and will occupy less space within the kiosk. Again, by positioning the interconnects 22 at the upper side 30c of the chassis 30, the cable 9 may simply drop downwardly into the volume or footprint below the scanner assembly 10, thereby reducing the overall footprint of the scanner assembly 10.

Figure 7:
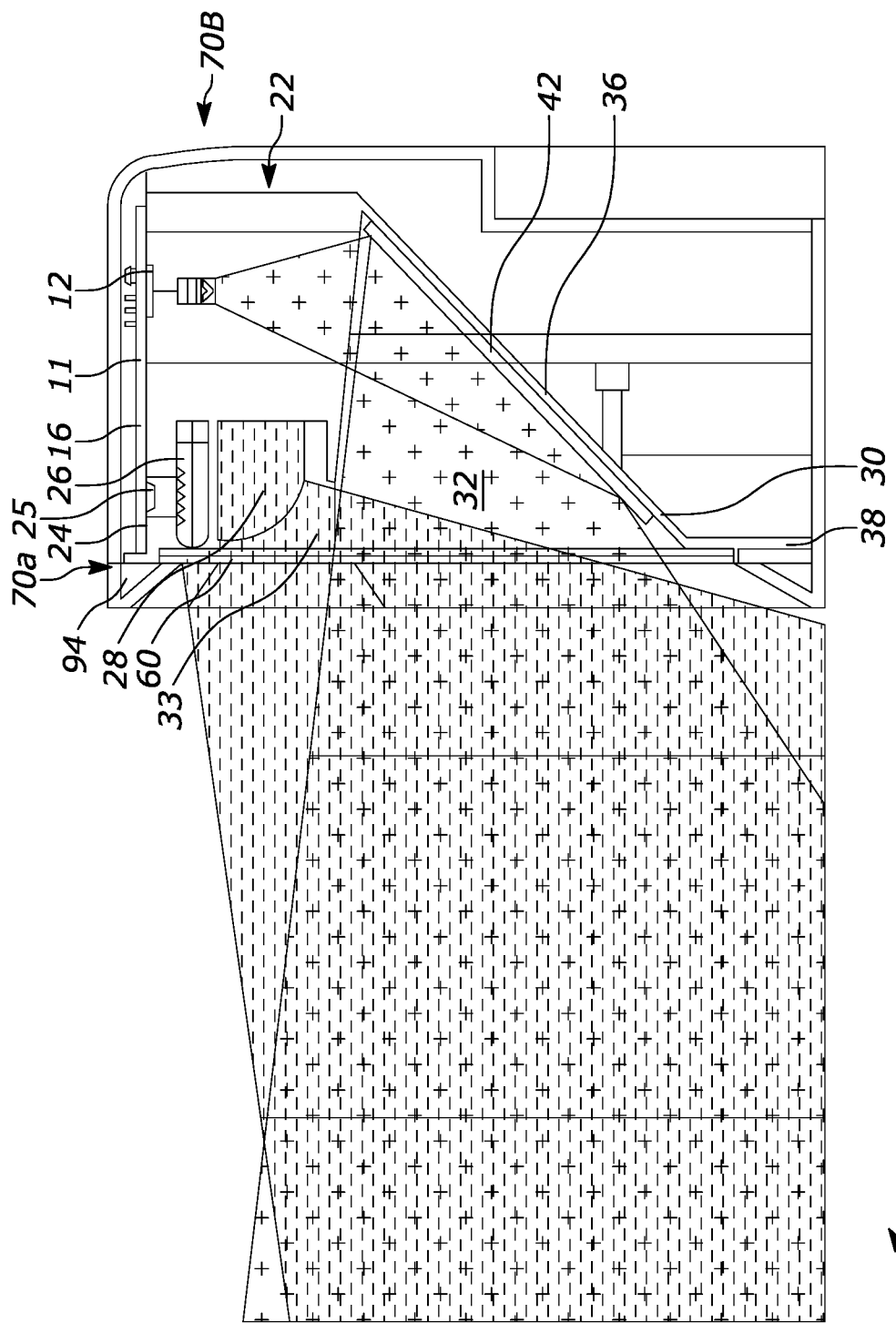
FIG. 7 is a side elevation cross sectional view of the industrial digital barcode reader assembly of FIGS. 1-6 illustrating a FOV in accordance with this disclosure.
Figure 8:
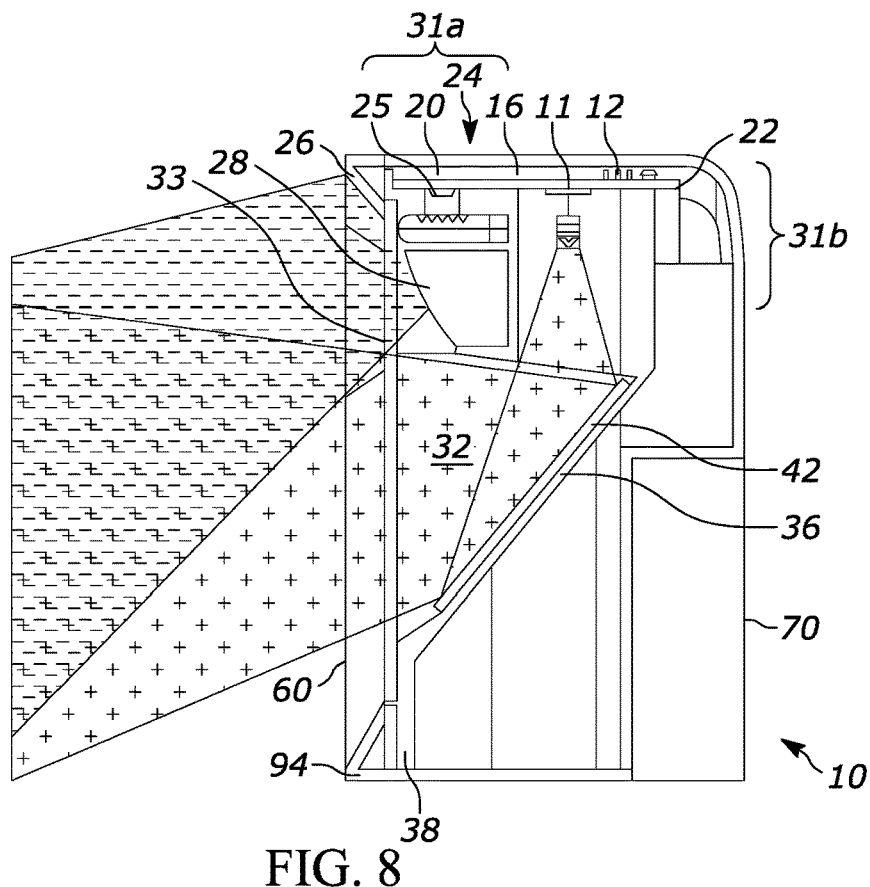
FIG. 8 is a side elevation cross sectional view of the industrial digital barcode reader assembly of FIGS. 1-7 illustrating an alternative FOV in accordance with this disclosure.

So configured, the scanner assembly 10 may be easily convertible to be used in horizontal or vertical environments. With reference to FIGS. 7-9, the FOV is arranged in a downwardly-tilted orientation. Such an orientation enables the scanner assembly 10, when in the horizontal configuration, to capture vertical barcodes that are swiped by it from the leading side of the scanner. Slightly tilting the FOV allows for a tall enough FOV for the scanner assembly 10, when in the vertical configuration, to still read barcodes that are high up on items that are swiped by. In these examples, an approximately 54°×36° FOV size using a 1920×1200 (2 MP) sensor, and an approximately 3.92" internal path length serves to achieve the desired resolution. This FOV results in an approximately 2.7" tall×4" wide at the front of the scanner.

A FOV tilt of approximately 14° downward is adequate to read as little as approximately 9 mil at approximately 3" for a perpendicular barcode, approximately 6.9 mil at approximately 3" when the code is tilted slightly (e.g., 10°) towards the scanner, approximately 6.7 mil at approximately 1" for a perpendicular barcode and approximately 5 mil at approximately 1" when the barcode is tilted slightly toward the scanner (e.g., approximately 10°). This ensures that the horizontal slot scanner can adequately read approximately 40% UPC barcodes that are standing near vertically from approximately 0-1" and still have a tall enough FOV for the vertical slot scanner (approximately 4.3" from the counter at approximately 5" from the face of the scanner), so that it can compete well with the competition and perform even better on perpendicular codes. These values may be adjusted depending on desired and/or anticipated scan distances.

In these examples, the off-axis illumination system 24 also has full coverage at the face of the scanner up to approximately 5" from the face, with a baffle 24a in between the two systems to prevent internal reflections. The center axis of the illumination system 94 is tilted forward by approximately 38° and can provide approximately 62° of vertical coverage to achieve full FOV coverage between the nose and approximately 5".

The scanner assembly 10 may include any number of additional components to assist in operation thereof. For example, the scanner assembly 10 may include any number of interface elements 90 that a user may interact with. The interface element 90 may be in the form of a button or buttons 92, an illumination member or members 24, a sound generating device 96 (e.g., a speaker or a beeper), and the like. Other examples are possible. Generally speaking, the interface elements 90 may be positioned at or near the flange 38 and/or a portion of the housing 70.

The interface elements 90 may be engagable, viewable, or audible from an outwardly facing side of the housing. For example, the button or buttons 92 may be positioned along the flange 38 of the chassis 30 and may be physically engagable through the first adapter 70 and the second adapter 84. The buttons 92 may be in the form of physical buttons or capacitive buttons. In examples using physical buttons, the first and second adapters 70, 84, and more specifically the platter 72 and the outer bezel 86, may include openings 72a, 86a through which the button or buttons 92 may protrude to be engaged by a user. In examples using capacitive buttons, the first and the second adapters 70, 84 may include an indicator (not illustrated) for where the user should press to engage the button 92. In some horizontal implementations, it may be desired to position the buttons 92 under the platter 72 to prevent a user from inadvertently pressing the button 92. Accordingly, the platter 72 may include a hollow cavity to accommodate any such button 92.

As previously noted, the illumination member 24 may include an indicator lightpipe 26, which may be viewable through the first window 60 and the second window 62 when the scanner assembly 10 is used in the horizontal configuration. The separate illumination cavity 33 may advantageously allow use of a parallel window 60 that is flush or nearly flush with the first end 64a of the exterior surface 64 of the housing 70, thereby allowing the scanner assembly 10 to be used in horizontal and kiosk configurations.

The sound generating device 96 may be positioned near and operably coupled with the circuit board 11 and may be disposed on the flange 38 of the chassis 30. As illustrated in FIG. 15, the flange 38 may include any number of speaker ports 36a to allow sound to travel through the flange 38. Similarly, the platter 72 and the outer bezel 86 may include openings 72b, 86b that allow the sound emitted from the sound generating device 96 to pass therethrough.

In some examples, a FOV tilt of 10.6° downward relative to a vertical axis may be adequate to read as little as 11.7 mil at 3" for a perpendicular barcode, 8 mil at 3" when the barcode is tilted (e.g., approximately 15°) towards the scanner, and 8.7 mil at 1" for a perpendicular barcode. This ensures that the horizontal slot scanner can read 60% UPC and lower densities and still have a tall enough FOV for the vertical slot scanner.

So configured, the scanner assembly 10 may be lower cost due to the use of shared parts and can easily be functionally adaptable as needed. By using a single scanner assembly for multiple orientations, a total number of product configurations may be reduced. The scanner assembly can be easily implemented in kiosks and self-checkout counters, and can easily be reused in stores even if they wish to change the type of scanner they are using. Further, by using a shared window for both configurations, the scanner assembly is more easily convertible and will maintain the seal for the optical cavity, even if the configuration is switched. The shared window is the only window for vertical orientations, and is retained by the front bezel (which may be snapped on). The shared window becomes the inner window when using the scanner assembly in the horizontal configuration.

Further, by using a single circuit board 11 positioned at the upper side/quadrant, only one fold mirror 24 is needed. As such, the opto-mechanics are all retained on the single circuit board 11, thereby reducing costs. The internal layout of the interconnects 22 advantageously works for both horizontal and vertical slot scanners as well as kiosk applications. The circuit board 11 and interconnects 22 are positioned high on the chassis 30 to avoid spills and to allow space for strain relief mechanisms to be hidden inside the chassis and/or housing, which may assist with installation and removal from horizontal and vertical mounting structures while having a minimal chance of anything being jostled while in a tightly-packed environment. Any cable strain reliefs may be fully contained within the housing, and can easily be guided down or to the side, thereby allowing the scanner to be slid straight in or out without disconnecting cables.

Because the interconnects 22 are downwardly-facing, the cables 9 may drop downwardly and not contact the external housing (tub) or environment. Such a configuration additionally eliminates sharp bends for the cable 9 to traverse due to ample space being in the rear of housing for routing. Additionally, in some examples, the housing may include slots used to run the cables out of the sides thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a", "has ... a", "includes ... a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A convertible slot scanner assembly for capturing at least one image of an object appearing in a field of view (FOV), the convertible slot scanner assembly comprising:
    a chassis body including an upper side, a front side, a rear side, an optical cavity, and an opening formed on the front side;
    a circuit board positioned at or near the upper side of the chassis;
    an imaging sensor operably coupled with the circuit board, the imaging sensor being directed toward the optical cavity to capture an image frame appearing in the FOV;
    a controller operably coupled with the circuit board and being in communication with the imaging sensor to control operation thereof;
    an image decoder operably coupled with the circuit board and in communication with the imaging sensor and the controller, the image decoder configured to receive the image frame and decode a barcode captured in image data captured by the imaging sensor;
    a first window configured to at least partially cover the opening of the chassis;
    a housing including a housing cavity dimensioned to at least partially accommodate the chassis, the housing being positionable in a first, horizontal configuration whereby the first window is in a generally horizontal orientation and a second, vertical configuration whereby the first window is in a generally upright orientation;
    a first adapter configured to be coupled with the chassis when the housing is positioned in the horizontal configuration;
    a second adapter configured to be coupled with the chassis when the housing is positioned in the vertical configuration; and
    a flange portion at least partially surrounding the opening of the chassis body.

2. The convertible slot scanner assembly of claim 1, further comprising at least one fold mirror at least partially disposed in the optical cavity, the at least one fold mirror configured to redirect the FOV of the imaging sensor through the first window.

3. The convertible slot scanner assembly of claim 1, further comprising at least one interconnect positioned at the upper side of the chassis body and being operably coupled with the circuit board.

4. The convertible slot scanner assembly of claim 3, wherein the at least one interconnect is downwardly-facing.

5. The convertible slot scanner assembly of claim 1, further comprising an illumination assembly positioned at or near the upper side of the chassis.

6. The convertible slot scanner assembly of claim 5, wherein the illumination assembly is operably coupled with the circuit board.

7. The convertible slot scanner assembly of claim 6, wherein each of the imaging sensor, the illumination assembly, the image decoder, and the controller are disposed on the circuit board.

8. The convertible slot scanner assembly of claim 5, further comprising a second circuit board, wherein the illumination assembly is operably coupled with the second circuit board.

9. The convertible slot scanner assembly of claim 5, wherein the chassis further includes an illumination cavity positioned a distance from the optical cavity and is at least partially isolated therefrom.

10. The convertible slot scanner assembly of claim 1, further comprising at least one cable guide member formed in the housing to accommodate an interface cable.

11. The convertible slot scanner assembly of claim 1, wherein the first adapter comprises:
   a platter including a platter opening and a second window configured to at least partially cover the platter opening.

12. The convertible slot scanner assembly of claim 11, wherein the first adapter further comprises a tub configured to engage at least one of the housing or the flange portion of the chassis, wherein the platter is configured to engage at least one of the tub, the flange portion of the chassis, or the housing.

13. The convertible slot scanner assembly of claim 1, wherein the second adapter comprises an outer bezel configured to engage at least one of the housing or the flange portion of the chassis.

14. The convertible slot scanner assembly of claim 13, wherein the outer bezel protrudes outwardly from the first window to form a recessed region.

15. The convertible slot scanner assembly of claim 1, further comprising at least one interface element.

16. The convertible slot scanner assembly of claim 15, wherein the at least one interface element comprises at least one of at least one button, an illumination member, or a sound generating device.

17. The convertible slot scanner assembly of claim 16, wherein the at least one interface element comprises the sound generating device, wherein a flange portion of the chassis further includes at least one sound port.

18. The convertible slot scanner assembly of claim 16, wherein the at least one interface element comprises the at least one button, the at least one button being engageable through a flange portion of the chassis.

19. The convertible slot scanner assembly of claim 15, wherein the at least one interface element comprises the illumination member, wherein the illumination member is viewable through the first window.

20. The convertible slot scanner assembly of claim 1, wherein the first window sealingly engages the optical cavity.

21. The convertible slot scanner assembly of claim 1, further comprising a flange portion of the chassis including at least one mounting mechanism.

22. The convertible slot scanner assembly of claim 1, wherein the chassis further comprises a mirror support member.

23. The convertible slot scanner assembly of claim 1, wherein the FOV is arranged non-perpendicularly relative to the first window.

24. The convertible slot scanner assembly of claim 1, wherein the circuit board is the only circuit board in the assembly.

25. A convertible slot scanner assembly for capturing at least one image of an object appearing in a field of view (FOV), the convertible slot scanner assembly comprising:
   a chassis body including an upper quadrant, a front quadrant, a front face formed on the front quadrant, an optical cavity, and an opening formed on the front face;
   a circuit board positioned within the upper quadrant of the chassis;
   at least one fold mirror positioned within the optical cavity;
   an imaging sensor operably coupled with the circuit board, the imaging sensor being directed downwardly toward the at least one fold mirror to capture an image frame appearing in the FOV;
   a controller operably coupled with the circuit board and being in communication with the imaging sensor to control operation thereof;
   an image decoder operably coupled with the circuit board and in communication with the imaging sensor and the controller, the image decoder configured to receive the image frame and decode a barcode captured in image data captured by the imaging sensor;
   a first window configured to at least partially cover the opening of the chassis, the first window being positioned within the front quadrant of the chassis and being angled less than approximately 15° relative to a plane formed by the front face of the chassis body;
   a housing including a housing cavity dimensioned to at least partially accommodate the chassis, the housing being positionable in a first, horizontal configuration whereby the first window is in a generally horizontal orientation and a second, vertical configuration whereby the first window is in a generally upright orientation;
   a first adapter configured to be coupled with the chassis when the housing is positioned in the horizontal configuration;
   a second adapter configured to be coupled with the chassis when the housing is positioned in the vertical configuration; and
   a flange portion at least partially surrounding the opening of the chassis body,
   wherein the at least one fold mirror configured to direct the FOV through the window and wherein a central axis of the FOV is angled less than approximately 20° relative to a plane perpendicular to the front face.

26. The convertible slot scanner assembly of claim 25, further comprising at least one interconnect positioned at the upper side of the chassis body and being operably coupled with the circuit board.

27. The convertible slot scanner assembly of claim 26, wherein the at least one interconnect is downwardly-facing.

28. The convertible slot scanner assembly of claim 25, further comprising an illumination assembly positioned at or near the upper side of the chassis.

29. The convertible slot scanner assembly of claim 28, wherein the illumination assembly is operably coupled with the circuit board.

30. The convertible slot scanner assembly of claim 29, wherein each of the imaging sensor, the illumination assembly, the image decoder, and the controller are disposed on the circuit board.

31. The convertible slot scanner assembly of claim 28, further comprising a second circuit board, wherein the illumination assembly is operably coupled with the second circuit board.

32. The convertible slot scanner assembly of claim 28, wherein the chassis further includes an illumination cavity positioned a distance from the optical cavity and is at least partially isolated therefrom.

33. The convertible slot scanner assembly of claim 25, further comprising at least one cable guide member formed in the housing to accommodate an interface cable.

34. The convertible slot scanner assembly of claim 25, wherein the first adapter comprises:
   a platter including a platter opening and a second window configured to at least partially cover the platter opening.

35. The convertible slot scanner assembly of claim 34, wherein the first adapter further comprises a tub configured to engage at least one of the housing or the flange portion of the chassis, wherein the platter is configured to engage at least one of the tub, the flange portion of the chassis, or the housing.

36. The convertible slot scanner assembly of claim 25, wherein the second adapter comprises an outer bezel configured to engage at least one of the housing or the flange portion of the chassis.

37. The convertible slot scanner assembly of claim 36, wherein the outer bezel protrudes outwardly from the first window to form a recessed region.

38. The convertible slot scanner assembly of claim 25, further comprising at least one interface element.

39. The convertible slot scanner assembly of claim 38, wherein the at least one interface element comprises at least one of at least one button, an illumination member, or a sound generating device.

40. The convertible slot scanner assembly of claim 38, wherein the at least one interface element comprises the sound generating device, wherein a flange portion of the chassis further includes at least one sound port.

41. The convertible slot scanner assembly of claim 38, wherein the at least one interface element comprises the at least one button, the at least one button being engageable through a flange portion of the chassis.

42. The convertible slot scanner assembly of claim 38, wherein the at least one interface element comprises the illumination member, wherein the illumination member is viewable through the first window.

43. The convertible slot scanner assembly of claim 25, wherein the first window sealingly engages the optical cavity.

44. The convertible slot scanner assembly of claim 25, wherein a flange portion of the chassis includes at least one mounting mechanism.

* * * * *